Figure 1:
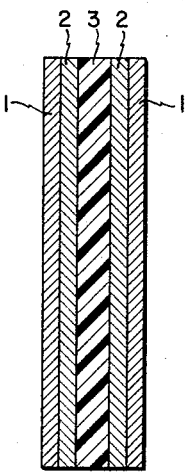

DUANE G. LEVINE
MORTON BELTZER   Inventors
BARRY L. TARMY

By W. O. Heilman

Patent Attorney

United States Patent Office 3,368,950
Patented Feb. 13, 1968

3,368,950
METHODS FOR ELECTRODEPOSITION ON THIN CONDUCTIVE FILMS
Duane G. Levine, Colonia, N.J., Morton Beltzer, New York, N.Y., and Barry L. Tarmy, Berkeley Heights, N.J., assignors to Esso Research and Engineering Company, a corporation of Delaware
Filed Nov. 27, 1962, Ser. No. 240,243
4 Claims. (Cl. 204—27)

This invention relates to making thin metallic conductive bodies. In particular, this invention relates to a method of electrodepositing uniform catalyst surfaces on thin electro conductive bodies. More particularly, this invention relates to a method of making improved fuel cell electrodes by electrochemically depositing a uniform noble metal catalytic coating on a thin less noble metal body.

The term "fuel cell" is used herein and in the art to denote a device, system or apparatus wherein chemical energy of a fluid, combustible fuel such as hydrogen, carbon monoxide, or an organic compound containing hydrogen in its molecular structure is electrochemically converted to electrical energy at a non-sacrificial electrode. The true fuel cell is adapted for continuous operation and is supplied with both fuel and oxidant from sources outside the cell proper. Such cells include at least two non-sacrificial electrodes, functioning as an anode and cathode, respectively. Said electrodes are separated by an electrolyte which provides ionic conductance therebetween. Conduction means for electrical connection between the anode and cathode external to the electrolyte are provided. Means for admitting a fluid fuel into dual contact with the anode and electrolyte and means for admitting an oxidant into dual contact with the cathode and the electrolyte are also necessary components. Where necessary or desired, the electrolyte compartment is divided into an anolyte compartment and a catholyte compartment by an ion-permeable partition or ion-exchange membrane or a plurality of same. Thus, in each such cell a fuel is oxidized at the anode and an oxidant is reduced at the cathode upon receiving electrons from such cathode.

Electrodes of the type hereinbefore and hereinafter referred to are also employed in electrolytic cells which unlike the aforementioned fuel cells do not provide a net production of electrical energy but in which an organic fuel is oxidized electrochemically at the anode thereof. In such cells a direct current of electrical energy from an alternating current rectifier, is admitted to the electrical circuit of the cell to provide an electron supply to the cathode. These cells evolve hydrogen from an aqueous electrolyte and water is added to the electrolyte while the cell is in operation. Such cells can be used for electrochemical production of various organic chemicals, e.g. conversion of alcohols to ketones.

Electrodes suitable for use in these cells have varied considerably in both design and composition. Although a single metal structure may be used alone, best results are obtained by using a conductive base structure with a catalyst uniformly deposited thereon.

Very thin bodies particularly of a metallic nature which are free of distortion are desirable and may be necessary in fuel cells wherein size is a critical factor.

By the methods hitherto practiced, uniform coatings of more noble metals could not be electrochemically deposited effectively on less noble metal conductive bodies having a depth in the range of about 0.01 to about 20 microns. In such processes a chemical exchange reaction takes place, i.e. the less noble metal of the body is replaced by the more noble metal in the solution. Since the less noble metal and the more noble metal, with the exception of monovalent gold and silver, do not have the same valences, atomic diameters and atomic geometry, perforations or large cavities are formed either through or substantially through the thin less noble metal body, which results in an increase in the resistance of such body. Since the replacement occurs only at the surface of the conductive body, one method of overcoming the increase in resistance due to replacement would be to increase the depth of the conductive body so that the holes would not extend through or substantially through the conductive body. However, where size and cost is a critical factor, as in fuel cells, such an expedient is not practical.

Another method of overcoming the replacement problem presented by the known art processes would be to deposit a more noble metal onto a structure composed of a less noble metal which is very close to the more noble in the electromotive series and which metals are similar in valence, interatomic dimensions, and atomic geometry. An example would be depositing monovalent gold (more noble) on a silver body (less noble) since both these metals have identical unit cells, i.e. face centered with the same crystallographic dimensions and atomic radii, and are both monovalent. By using metals such as silver and monovalent gold, there is no destruction of the silver film due to the replacement of silver by gold. However, if trivalent gold is the catalytic material to be deposited on silver, the resistance of the silver body is increased since three silver atoms leave and only one gold atom is available to replace same.

By the method of the present invention, any more noble metal can be electrochemically deposited on a less noble metal without increasing the resistance of the substrate. As used in this specification a "more noble metal" is a metal whose ions are stronger oxidizing agents than the ions of the less noble metal. The following combinations are submitted as examples of more noble metals that may be deposited on less noble metals by the instant process: platinum on gold, platinum on silver, palladium on silver, gold (mono or trivalent) on silver, rhodium on silver, gold on copper, silver on copper, nickel on iron, or platinum on iron. The foregoing examples are not submitted as limiting as to the combinations of metals possible by our process. One skilled in the art by using the method of this invention, could deposit any more noble metal on any very thin less noble metal substrate.

According to the present invention, the method of depositing a uniform coating of a more noble metal on a thin electro conductive sheet of a less noble metal in cases where the oxidation of the metal sheet by ions of the more noble metal is rapid without increasing the resistance of such sheet comprises; applying a continuous electrical contact, i.e. current collector, around the periphery of the thin conductive sheet, connecting the said current collector through a source of direct electric current to a further anode electrode so that the electrical current flows as soon as the thin sheet and current-collector contact the bath, immersing said sheet for a time sufficient to deposit the desired amount of more noble metal, removing and washing the more noble metal coated body.

The current density at which the electrodeposition cell is operated and the duration of the immersion are only significant with regard to the amount of more noble metal to be deposited and may be predetermined by procedures well known in the art. More or less catalyst may be deposited depending upon the use intended for the catalyst coated conductive substrate and the metal used as a catalyst. The temperature of the bath during the deposition is from about 15 to 90° C., preferably room temperature. The electrical contact must be continuous and at the periphery of the substrate, i.e. metallic body to be coated. If noncontinuous contacting means, such as parallel clamps or point contact between the current collector and the sheet are used, the coating deposited will not be uniform and chemical replacement will occur at the portions of the thin metal sheet remote from the contact point. The current for the electrodeposition must start to flow immediately upon the thin metallic sheet contacting the bath. This is accomplished by preparing the circuit so that the circuit is closed by the contact of the thin metallic sheet with the bath. If the sheet is immersed for any period of time before the current is initiated, a chemical exchange reaction occurs which results in an increase in the resistance of the thin conductive sheet.

Any conventional bath may be used in this process. The bath used will depend only upon the choice of metal to be deposited.

In some cases, it will be desirable to adhere the thin conductive body to a porous membrane. In the case of a fuel cell, a porous membrane bearing thin conductive metal films on both sides is desirable since the membrane would protect the thin conductive films. In such cases the metal films on opposite sides of the membrane could act as the electrodes of a cell, and the membrane would function as an electrolyte chamber when saturated with an electrolyte. It is sometimes also desirable to only apply a metal film to only one side of a membrane. In such a case one could effectively construct a cell by putting two such metal clad membranes in justaposition so that the unclad sides of the membranes are together. The thin metallic films may be formed either on one or both sides of a membrane by any of the methods known in the art or, for example, by the methods described in commonly assigned copending application Ser. No. 163,822, filed Jan. 2, 1962, now abandoned, which comprises treating the membrane with a water soluble dye and then contacting such treated dye with a salt of the metal to be deposited, again contacting the membrane with a solution of a reducing agent and metal salt. By the method of the present invention more noble metal coatings can be deposited upon the thin conductive metal surfaces of a metal clad membrane to form effective electrodes. For the electrode to be effective in a fuel cell the more noble metal need only be deposited on the side of the electrode which is first contacted by the fuel or, in the case of the cathode, the oxidant. The more noble metal coating acts as a catalyst for the oxidation of the fuel or in the case of the cathode, the more noble metal catalyst is for the reduction of the oxidant. Each of the metal surfaces of the membrane may be coated with the same more noble metal or each metal surface may be coated with a different more noble metal. This is easily accomplished by methods well known in the art, for example, by coating one side with paraffin before depositing the more noble metal.

Representative products which are prepared in accordance with this invention are shown in the accompanying drawing:

FIGURE 1 is an enlarged side view of a less noble metal surfaced 2 porous membrane 3 which has been uniformly coated with a more noble metal 1 in accordance with this invention. A continuous current collector is attached to the entire periphery of the metal surfaced membrane, the circuit is preset so that when any part of the metal surfaced membrane touches the bath, the circuit is closed and current flows. The membrane is left in the bath for a predetermined time so that a determined amount of more noble metal will be deposited uniformly upon the less noble metal surface of the membrane.

Figure 2:
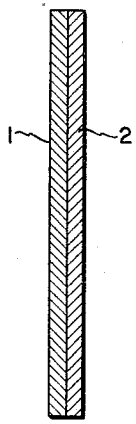

FIGURE 2 is an enlarged side view of a thin, less noble metal substrate 1 which has been uniformly coated with a more noble metal 2 in accordance with this invention.

The following examples are illustrative and should not be construed as limiting the true scope of this invention as set forth in the claims.

*Example 1*

A clean 4 x 6 inch silver substrate, 5 microns thick, was placed in an electroconductive frame. Said frame made continuous electrical contact around the periphery of the silver substrate. The current was initiated when the substrate was immersed in a 1 liter solution of water, 0.4 g. of lead acetate and 30 g. of $H_2PtCl_6 \cdot nH_2O$ containing at least 40% platinum. The bath temperature was 75° F. and the current density was maintained at 10 amps/ft.$^2$ for about 10.5 minutes. A uniform coating of about 3.17 g./ft.$^2$ of platinum was deposited on the silver substrate. The coated silver substrate was removed from the bath, washed and then dried.

*Example 2*

A clean 2 x 3 inch silver substrate 0.5 micron thick was placed in an electroconductive frame which made continuous electrical contact around the periphery of the substrate. The current was initiated as the substrate was immersed in a bath as set forth in Example 1. The bath temperature was about 75° F. and the current density was about 5 amps/ft.$^2$ for about 20 minutes. A uniform coating of about .33 g./ft.$^2$ of platinum was deposited on the silver substrate. The coated silver substrate was removed, washed and then dried.

*Example 3*

A silver substrate was coated with .33 g./ft.$^2$ of gold in accordance with the procedure of Example 2. The bath was made from one liter of solution comprising 30 g. of $HAuCl_4 \cdot 3H_2O$ and water.

In all 3 of the foregoing examples there was no perceptible pitting of the substrate and essentially no increase of resistance during the time of applying the overlying coating a platinum or gold. However, when noncontinuous current collectors are used or the plate to be coated is either wholly or partially immersed before the current starts to flow, the resistance of the plate increases measurably. The resistance of a silver plate increased from 5 ohms/cm. in 15 minutes to 100 ohms/cm. in 1 hour and the resistance approached infinity after 5 hours.

Photomicrographs are available to show the difference between electrodes prepared by the instant process and the prior art processes. The electrodes prepared by processes other than that instantly claimed show extensive pitting of the substrate and uneven distribution of the coating of more noble metal. The electrodes prepared by the process of this invention are substantially free of such defects.

What is claimed is:

1. A process for electrodepositing a uniform coating of more noble metal onto a thin sheet of electroconductive less noble metal having a thickness in the range of about 0.01 to about 20 microns to form an electrode, which comprises attaching a continuous current collector to the said sheet in electrical contact with said thin metal sheet around substantially the entire periphery thereof, connecting said current collector through a direct current supply source to an anode in contact with a bath of a solution of a salt of the said more noble metal, immersing the said thin sheet of less noble metal and the accompanying current collector into said bath so that current flows through the said bath to said anode immediately on contact of the sheet and current collector with the bath, maintaining the sheet in the bath until a coating of the more noble metal of the desired thickness has formed thereon.

2. A method as in claim 1 wherein trivalent gold is deposited upon a silver substrate.

3. A method as in claim 1 wherein platinum is deposited on silver.

4. An electrode prepared by the process of claim 1.

References Cited

UNITED STATES PATENTS

| | | | |
|---|---|---|---|
| 578,070 | 8/1897 | Woolf | 204—286 |
| 2,709,847 | 6/1955 | Ihire | 204—33 |

HOWARD S. WILLIAMS, *Primary Examiner.*

JOHN H. MACK, *Examiner.*

T. TUFARIELLO, *Assistant Examiner.*